United States Patent [19]

Holmes

[11] 3,927,035

[45] Dec. 16, 1975

[54] PRODUCTION OF 2,2-DISUBSTITUTED PROPIOLACTONES

[75] Inventor: Jerry D. Holmes, Longview, Tex.

[73] Assignee: Eastman Kodak Company, Rochester, N.Y.

[22] Filed: Nov. 3, 1972

[21] Appl. No.: 303,568

[52] U.S. Cl. .............................................. 260/343.9
[51] Int. Cl.² ........................................ C07D 305/12
[58] Field of Search ................................... 260/343.9

[56] References Cited
UNITED STATES PATENTS

| | | | |
|---|---|---|---|
| 2,469,690 | 5/1949 | Hagemeyer et al. | 260/343.9 |
| 2,469,704 | 5/1949 | Stone | 260/343.9 |
| 2,806,064 | 9/1957 | McKlveen | 260/343.9 |
| 3,201,474 | 8/1965 | Hasek et al. | 260/343.9 |
| 3,221,028 | 11/1965 | Natoris et al. | 260/343.9 |

Primary Examiner—Donald G. Daus
Assistant Examiner—Anne Marie T. Tighe
Attorney, Agent, or Firm—Edward R. Weber; Cecil D. Quillen, Jr.

[57] ABSTRACT

The present invention relates to a process for the manufacture of 2,2-disubstituted propiolactones from isoanhydrides and formaldehyde, as shown in the following equation:

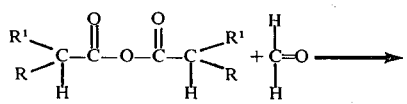

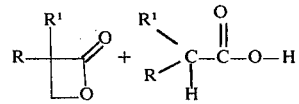

wherein R and R¹ individually may be a straight or branched chain alkyl, aryl, or aralkyl group having 1 to 10 carbon atoms. The reaction is conducted in the presence of a catalyst comprising a complex of tin oxide and silica gel at a temperature of from about 190°C. to about 400°C.

22 Claims, No Drawings

PRODUCTION OF 2,2-DISUBSTITUTED PROPIOLACTONES

The present invention relates to a process for preparing 2,2-disubstituted propiolactones by the reaction of an isoanhydride with formaldehyde according to the following formula:

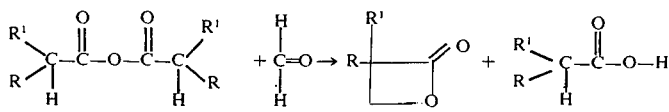

wherein R and $R^1$ individually is a straight or branched chain alkyl, aryl or aralkyl group of from 1 to 10 carbon atoms, and preferably 1 to 6 carbon atoms, at a temperature of from about 190°C. to about 400°C.

2,2-Disubstituted propiolactones are useful in the polymer industry as a starting material for synthetic resins and synthetic fibers. They are also useful in the pharmaceutical industry and have heretofore been prepared by a variety of methods. For example, in U.S. Pat. No. 2,356,459, there is described a well-known method for preparing 2,2-disubstituted propiolactones by the addition reaction of dimethyl ketene and formaldehyde. The known methods for the manufacture of 2,2-disubstituted propiolactones, however, can be practiced on the commercial scale only with difficulties and resultant economic disadvantages.

It is, therefore, an object of my invention to provide a simplified method for the preparation of 2,2-disubstituted propiolactones.

It is another object to provide a one-step method for the preparation of 2,2-disubstituted propiolactones.

Other objects of the invention will become apparent from a consideration of the specification and claims of this application.

The prior literature describes a reaction of primarily aromatic aldehydes with anhydrides to give unsaturated acids. These reactions are normally conducted in the liquid phase using basic catalysts. Aliphatic aldehydes are usually unsuitable for this reaction. In the liquid phase, aldehydes normally react with anhydrides to form gem-diesters. For example, formaldehyde, when reacted with butyric anhydride, normally gives methylene dibutyrate (J. F. Walker, "Formaldehyde", 3rd Ed., ACS Monograph Series No. 152, Reinholt, p. 350). No prior literature is known which describes the condensation of aldehydes with acid anhydrides to produce lactones. It was therefore quite unexpected that formaldehyde could be made to condense in any significant amount with an anhydride to form a 2,2-disubstituted propiolactone.

In the process of the instant invention, an isoanhydride having the formula

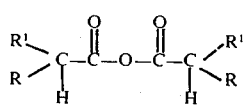

is condensed with formaldehyde to yield a 2,2-disubstituted propiolactone having the formula

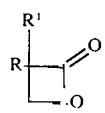

and an organic acid having the formula

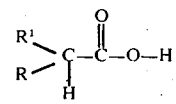

wherein R and $R^1$ individually in each of the above formulas can be any straight or branched chain alkyl, aryl or aralkyl group containing 1 to 10 carbon atoms, and preferably 1 to 6 carbon atoms.

The reaction is catalyzed by a catalyst comprising a complex formed by reacting a tin salt with silica gel and calcining the resultant mixture. The exact nature of the catalyst is not known. U.S. Pat. No. 3,520,915 describes a stannous oxide-silica complex which is hypothesized to have the formula $[-Sn-O-Si-O]_n$ which is useful for the dehydrogenation of saturated aliphatic nitriles. Likewise, it has been found that a simple catalyst consisting of tin oxide deposited upon silica will catalyze the condensation reaction of an isoanhydride and formaldehyde to form pivalolactone. It was completely unpredictable, however, that catalysts formed by an interaction of a tin salt with silica would be more effective than a simple tin oxide-silica mixture. Also, one could not predict that a catalyst used for the dehydrogenation of a nitrile would promote a condensation reaction. Although the exact nature of the catalyst of the instant invention is not known, the catalyst complex is formed by reacting a tin salt with silica gel at a temperature of from about 60°C. to about 250°C. in a suitable solvent and than neutralizing the solution with an aqueous base. Preferred silica gels are those having a surface area of from about 100 square meters per gram to about 600 square meters per gram and a pore volume of from about 0.3 cc. per gram to about 1.70 cc. per gram. Suitable tin salts include stannous chloride, stannic chloride, stannous bromide, stannic bromide, stannous isobutyrate, stannous acetate, and stannous benzoate. The resultant catalyst is then calcined at about 400°C. to about 550°C., preferably about 500°C. to about 550°C., for from 2 to 4 hours.

A specially active catalyst is prepared by reacting a large pore, low surface area, silica gel (Davison Grade G-59) with stannous chloride in acetophenone at a temperature of from about 140°C. to about 170°C. for about 5 hours and then neutralizing the catalyst with aqueous NH₄OH, followed by calcining as previously described. Using a catalyst of this nature, an exceptionally high condensation of formaldehyde with isobutyric anhydride to form pivalolactone was obtained when the condensation reaction is operated at from about 250°C. to about 275°C.

Suitable solvents for forming the catalyst are nonreactant solvents which will solubilize the tin salt, such as ketones, esters, ethers, hydrocarbons and chlorinated hydrocarbons. Particular solvents which are useful are acetone, acetophenone, benzophenone, methyl acetate, chlorobenzene, hexane, diphenyl ether, diphenyl, and methyl benzoate. The catalyst can be formed by reacting the tin salt with silica gel in a solvent of the type previously mentioned at temperatures of from about 60°C. to about 250°C. The length of time for reaction depends on the salt used and the temperature, but in general at 60°C. to 150°C. about 5–6 hours is adequate, whereas at 150°C. to 250°C. about 2–4 hours is sufficient.

Preferably, the temperature of the condensation reaction will be sufficient to insure vaporization of the reactants and the products. Temperatures from about 190°C. to about 400°C. may be used. High conversions and yields have been obtained operating in a preferred range of from about 230°C. to about 280°C.

The reaction may be carried out at atmospheric, subatmospheric, or superatmospheric pressure. If desired, an inert diluent gas may be utilized to facilitate feeding of the reactants, control of contact time, etc. Good results are obtained at atmospheric pressure using an inert diluent gas, usually in a molar ratio of gas to organic feed of from about 1:10 to about 20:1, preferably about 1:1 to 6:1, and most preferably about 2:1 to 4:1. Suitable inert diluent gas is any gas which does not react with either the reactants or the products under the conditions of the reaction, such as $N_2$, argon, helium, gaseous hydrocarbons and compounds which are readily vaporized, such as benzene. Contact time may be from about 0.5 to about 5 seconds, with good results being obtained at about 2 seconds.

Suitable anhydrides include isobutyric, 2-ethylhexanoic, 2-phenylpropionic, 2-ethylpropionic, 2-ethylbutyric, and 2-methylpentanoic.

Formaldehyde may be fed as a gaseous monomer, as a trioxane solution, or as a paraformaldehyde slurry. It has been found that the aldehyde conversion to lactone is dependent on the amount of anhydride fed. A molar ratio of from about 1.15:1 to about 5:1, preferably from about 3:1 to about 4:1 of anhydride to formaldehyde (as trioxane) in the feed mixture produces good results. When a 3:1 mole ratio of isobutyric anhydride to formaldehyde was fed, the conversion of formaldehyde to pivalolactone was 65–70 percent per pass. This conversion would change with differing molar ratios of feeds, however, the 3:1 feed gave results easily adapted to a commercial unit. The optimum ratio will depend upon various manufacturing considerations, such as refining and recycling of unreacted feed materials. There appears to be no upper limit to this ratio other than practical manufacturing considerations which arise when a large excess of one material is introduced into a system. In general, a higher anhydride to formaldehyde ratio gives higher formaldehyde conversion, but also decreases the percentage of lactone in the product.

The process of the invention is illustrated in greater detail by the following examples, all of which are run at atmospheric pressure, but it will be understood that these examples are not intended to limit the invention in any way, and obvious modifications will occur to those skilled in the art.

EXAMPLE 1

This example describes an effective method for preparing the preferred tin oxide-silica complex and illustrates its effectiveness to produce pivalolactone. Using a well-stirred container 25 grams of stannous chloride dihydrate dissolved in 500 ml. of acetophenone is reacted at 140°–150°C. for 5 hours with Davison Chemical Company's G-59 silica gel (surface area 340 sq.m./g. - pore volume 1.15 cc./g.). Some water is released during the reaction and it is removed via a Dean-Stark trap using benzene (50–60 ml.) as an azeotroping agent. After completion of this portion of the reaction, the mixture is cooled and the solvent decanted from the catalyst. The catalyst is then washed thoroughly portionwise with 2–4 liters of actone. Aqueous ammonium hydroxide (500 ml.) is then added to the washed catalyst and all the solvent is removed by evaporation on a steam bath.

To a 22 mm. by 2 foot Vycor reactor is charged 50 ml. (20 grams) of the above-described catalyst. The catalyst is fired at 550°C. with a nitrogen sweep for 2 hours and is burned clean by switching from nitrogen to air for one hour. At this point the catalyst is ready for use and the reactor temperature is brought to the desired range of 250°–265°C. Nitrogen is fed at a rate of 1.25 moles per hour as an inert diluent gas. A 3:1 molar ratio of isobutyric anhydride to formaldehyde (fed as trioxane) is pumped through the reactor at an average rate of 59 ml. per hour. The product is cooled, collected, and analyzed primarily by gas liquid chromatography. Data for a typical 24 hour run using fresh catalyst are summarized below.

|  | Fed (Moles) | Recovered (Moles) |
|---|---|---|
| Isobutyric Anhydride | 8.12 | 5.27 |
| Formaldehyde (as Trioxane) | 2.71 | 0.24 |
| Pivalolactone | 0 | 1.95 |
| Isobutyric Acid | 0.11 | 2.84 |
| Formaldehyde Conversion to Pivalolactone: | | 72% |
| Isobutyric Anhydride Yield to Pivalolactone: | | 68% |

EXAMPLE 2

This example describes the preparation of a stannic oxide-silica complex type catalyst and illustrates its use as a pivalolactone catalyst. In a well-stirred flask 22 grams of stannic chloride dissolved in 500 ml. chlorobenzene is reacted with 100 grams of dehydrated (150°C./25 mm.) Davison G-59 silica gel at 80°C. for 6 hours. The catalyst is then washed, neutralized with ammonium hydroxide, and calcined at 550°C. following the same procedures described in Example 1.

Using the same feed mixture and reaction conditions described in Example 1, over an 8 hour period formaldehyde conversion to pivalolactone is 58 percent and isobutyric anhydride yield is 65 percent.

EXAMPLE 3

This example describes the preparation of tin oxide on silica gel and illustrates its use. Davison G-59 silica gel (141 grams) is left standing for 20–24 hours in a solution of 32 grams stannous chloride dihydrate in 300 ml. of methanol. To this mixture is added 400 ml. ammonium hydroxide and solvent is removed by evaporation on a steam bath. The catalyst is calcined in a manner similar to that described in Example 1. Using the same feed and conditions as described in Example 1, over a 6 hour period formaldehyde conversion to pivalolactone is 46 percent and isobutyric anhydride yield to pivalolactone is 66 percent. During the 6 hours the pivalolactone concentration in the product decreases from 11.5 percent initially to 7.5 percent during the last hour.

EXAMPLE 4

This example illustrates the increased catalyst activity and life obtained when the catalyst is prepared to form the tin oxide-silica complex rather than deposited tin oxide on silica as described in Example 3. Following the same procedures as described in Example 1 except that 31.6 grams of stannous chloride dihydrate is reacted with 141 grams silica gel in refluxing acetone for 6 hours, a catalyst is obtained which over an 8 hour period gives 61.4 percent conversion of formaldehyde to pivalolactone and 71 percent yield from isobutyric anhydride. The percent pivalolactone by gas liquid chromatography in the product ranges from a high of 13.2 to a low of 12.4 and ranges almost steadily at 12.4 to 12.8.

EXAMPLE 5

This example illustrates the use of lower boiling solvents for forming the stannous oxide-silica complex. Following the same procedures as described in Example 1 except using acetone at reflux temperature in place of acetophenone, a catalyst is obtained which gives over a 24 hour period 66 percent conversion of formaldehyde to pivalolactone and 70 percent yield based on isobutyric anhydride.

EXAMPLE 6

This example illustrates the use of a support other than silica gel. In a stirred vessel 38 grams of stannous chloride dihydrate is reacted with 127 grams of celatom in 750 ml. of refluxing acetone for 12 hours. The catalyst is then washed with acetone, neutralized with ammonium hydroxide, and calcined at 550°C. following the procedure described in Example 1. Using similar procedures and conditions as described in Example 1, this catalyst gives a 37 percent conversion of formaldehyde to pivalolactone over a 3 hour test period.

EXAMPLE 7

This example illustrates the use of tin salts other than the tin halides. In a stirred vessel equipped with condenser and a Dean-Stark trap are charged 180 ml. acetophenone, 11.5 grams stannous isobutyrate, 40 ml. benzene, and 30 grams Davison G-59 silica gel. This mixture is stirred and heated at 160-170°C. for 4.5–5 hours. After cooling, the catalyst is separated from the solvent by filtration and is then washed thoroughly with acetone. It is then hydrolyzed as usual with 180 ml. ammonium hydroxide and then calcined at 550°C. Using a similar procedure and conditions as described in Example 1, this catalyst gives a 66 percent conversion of formaldehyde to pivalolactone and 61 percent isobutyric anhydride yield.

The invention has been described in detail with particular reference to preferred embodiments thereof, but it will be understood that variations and modifications can be effected within the spirit and scope of the invention as described hereinabove.

I claim:

1. A process for producing a 2,2-disubstituted propiolactone having the formula

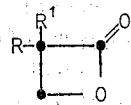

which comprises the steps of reacting an isoanhydride having the formula

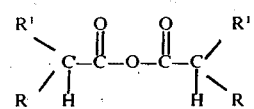

wherein R and R$^1$ individually is straight or branched chain alkyl having 1 to 10 carbon atoms, with formaldehyde or a formaldehyde yielding material at a temperature of from about 190°C. to about 400°C. in the presence of a catalyst consisting essentially of the calcined reaction product of the complex obtained when a tin salt selected from the group consisting of stannous chloride, stannic chloride, stannous bromide, stannic bromide, stannous isobutyrate, stannous acetate, and stannous benzoate is reacted with silica gel at a temperature of from about 60°C. to about 250°C.

2. The process of claim 1 wherein R and R$^1$ individually is a straight or branched chain alkyl group having 1 to 6 carbon atoms.

3. The process of claim 1 wherein the isoanhydride is selected from the group consisting of isobutyric anhydride, 2-ethylhexanoic anhydride, 2-phenylpropionic anhydride, 2-ethylpropionic anhydride, 2-ethylbutyric anhydride, and 2-methyl pentanoic anhydride.

4. The process of claim 1 wherein the tin salt is reacted with silica gel at a temperature of from about 100°C. to about 180°C.

5. The process of claim 1 wherein the tin salt is reacted with the silica gel in the presence of a solvent selected from the group consisting of acetone, acetophenone, benzophenone, methyl acetate, chlorobenzene, hexane, diphenyl ether, diphenyl, and methyl benzoate.

6. The process of claim 1 wherein the isoanhydridealdehyde reaction is conducted at a temperature of from about 230°C. to about 280°C.

7. The process of claim 1 wherein the isoanhydridealdehyde reaction is conducted at atmospheric pressure.

8. The process of claim 1 wherein the product of the reaction of the tin salt with silica gel is calcined at a temperature of from about 400°C. to about 550°C.

9. The process of claim 8 wherein the reaction product is calcined at a temperature of from about 500°C. to about 550°C.

10. The process of claim 8 wherein the calcining is conducted for from about 2 hours to about 4 hours.

11. The process of claim 1 wherein the ratio of anhydride fed to aldehyde is from about 1.15 to 1 to about 5 to 1.

12. The process of claim 11 wherein the ratio of anhydride fed to aldehyde is from about 3 to 1 to about 4 to 1.

13. A process for producing pivalolactone whereby isobutyric anhydride and formaldehyde or a formaldehyde yielding material are reacted at a temperature of from about 190°C. to about 400°C. in the presence of a catalyst consisting essentially of the calcined reaction product of the complex obtained when a tin salt selected from the group consisting of stannous chloride, stannic chloride, stannous bromide, stannic bromide, stannous isobutyrate, stannous acetate, and stannous benzoate is reacted with silica gel at a temperature of from about 60°C. to about 250°C.

14. The process of claim 13 wherein the tin salt is reacted with silica gel at a temperature of from about 100°C. to about 180°C.

15. The process of claim 13 wherein the isoanhydride-aldehyde reaction is conducted at a temperature of from about 230°C. to about 275°C.

16. The process of claim 13 wherein the isoanhydride-aldehyde reaction is conducted at atmospheric pressure.

17. The process of claim 13 wherein the product of the reaction of the tin salt with silica gel is calcined at a temperature of from about 400°C. to about 550°C.

18. The process of claim 17 wherein the reaction product is calcined at a temperature of from about 500°C. to about 550°C.

19. The process of claim 17 wherein the calcining is conducted for from about 2 hours to about 4 hours.

20. The process of claim 13 wherein the ratio of anhydride fed to aldehyde is from about 1.15 to 1 to about 5 to 1.

21. The process of claim 20 wherein the ratio of anhydride fed to aldehyde is from about 3 to 1 to about 4 to 1.

22. The process of claim 13 wherein the tin salt is reacted with the silica gel in the presence of a solvent selected from the group consisting of acetone, acetophenone, benzophenone, methyl acetate, chlorobenzene, hexane, diphenyl ether, diphenyl, and methyl benzoate.

* * * * *